(12) United States Patent
Wang et al.

(10) Patent No.: US 8,370,386 B1
(45) Date of Patent: Feb. 5, 2013

(54) METHODS AND SYSTEMS FOR TEMPLATE DRIVEN DATA MINING TASK EDITING

(75) Inventors: Changzhou Wang, Bellevue, WA (US); Jai Joon Choi, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 479 days.

(21) Appl. No.: 12/611,624

(22) Filed: Nov. 3, 2009

(51) Int. Cl.
*G06F 7/00* (2006.01)
*G06F 17/30* (2006.01)

(52) U.S. Cl. .......................................... 707/778; 707/779
(58) Field of Classification Search .................. 707/776, 707/778, 779
See application file for complete search history.

(56) References Cited

U.S. PATENT DOCUMENTS

| | | | |
|---|---|---|---|
| 5,907,328 A | 5/1999 | Brush, II et al. | |
| 6,076,088 A | 6/2000 | Paik et al. | |
| 6,154,739 A | 11/2000 | Wrobel | |
| 6,493,723 B1 | 12/2002 | Busche | |
| 6,611,825 B1 | 8/2003 | Billheimer et al. | |
| 6,697,802 B2 * | 2/2004 | Ma et al. ............................... | 1/1 |
| 6,701,305 B1 | 3/2004 | Holt et al. | |
| 7,027,055 B2 | 4/2006 | Anderson et al. | |
| 7,047,226 B2 | 5/2006 | Rubin | |
| 7,085,683 B2 * | 8/2006 | Anderson et al. ............. | 702/186 |
| 7,096,206 B2 | 8/2006 | Hitt | |
| 7,107,285 B2 | 9/2006 | von Kaenel et al. | |
| 7,124,438 B2 | 10/2006 | Judge et al. | |
| 7,146,384 B2 | 12/2006 | Sawafta | |
| 7,240,038 B2 | 7/2007 | Hitt | |
| 7,447,666 B2 * | 11/2008 | Wang ............................. | 706/45 |
| 7,698,351 B1 * | 4/2010 | Hing et al. ..................... | 707/827 |
| 7,818,665 B1 * | 10/2010 | Russin et al. .................. | 715/236 |
| 2002/0161733 A1 * | 10/2002 | Grainger ........................... | 706/45 |
| 2003/0212693 A1 * | 11/2003 | Campos et al. ................. | 707/100 |
| 2003/0217052 A1 | 11/2003 | Rubenczyk et al. | |
| 2003/0217055 A1 | 11/2003 | Lee et al. | |
| 2003/0229884 A1 * | 12/2003 | Carr et al. ...................... | 717/101 |
| 2004/0049499 A1 | 3/2004 | Nomoto et al. | |
| 2004/0215599 A1 * | 10/2004 | Apps et al. .......................... | 707/2 |
| 2005/0015357 A1 * | 1/2005 | Shahidi ............................. | 707/1 |
| 2005/0177540 A1 | 8/2005 | Ankerst et al. | |
| 2005/0193029 A1 * | 9/2005 | Rom et al. ..................... | 707/200 |
| 2005/0228899 A1 * | 10/2005 | Wendkos et al. .............. | 709/232 |
| 2006/0020619 A1 * | 1/2006 | Netz et al. ..................... | 707/102 |

(Continued)

FOREIGN PATENT DOCUMENTS

WO  2009020727 A1  2/2009
WO  WO 2009020727 A1 *  2/2009

OTHER PUBLICATIONS

International Search Report and Written Opinion of PCT/US2008/069202; Nov. 27, 2008; 15 pages.

(Continued)

*Primary Examiner* — Wilson Lee
*Assistant Examiner* — Mark Hershley
(74) *Attorney, Agent, or Firm* — Armstrong Teasdale, LLP (57) ABSTRACT

A computer-based method for creating data mining task templates for utilization in data mining activities is described. The method includes defining, via a template editor and an associated user interface, a task template for discovery of common patterns occurring within data mining events, generating a task editor/wizard from the task template, creating example tasks via the task template and task editor/wizard, running at least one of the example tasks, and refining the task template using results returned from execution of the at least one of the example tasks.

24 Claims, 8 Drawing Sheets

U.S. PATENT DOCUMENTS

| | | | |
|---|---|---|---|
| 2006/0074824 A1 | 4/2006 | Li | |
| 2007/0005634 A1* | 1/2007 | Selca et al. | 707/102 |
| 2007/0067145 A1* | 3/2007 | Miller et al. | 703/6 |
| 2007/0100990 A1* | 5/2007 | Brown et al. | 709/224 |
| 2007/0208800 A1* | 9/2007 | Frohlich et al. | 709/203 |
| 2007/0219992 A1* | 9/2007 | Bollinger et al. | 707/6 |
| 2007/0299795 A1* | 12/2007 | Macbeth et al. | 706/16 |
| 2008/0114719 A1* | 5/2008 | Anderson et al. | 707/2 |
| 2009/0031206 A1* | 1/2009 | Aureglia et al. | 715/217 |
| 2009/0043766 A1 | 2/2009 | Wang et al. | |
| 2009/0281865 A1* | 11/2009 | Stoitsev | 705/9 |
| 2010/0199181 A1* | 8/2010 | Robertson et al. | 715/709 |

OTHER PUBLICATIONS

Xu, W. et al.; The Application of Spatial Data Mining in Railway Geographic Information Systems; IEEE Intelligent Transportation Systems; Oct. 12, 2003; pp. 1467-1471; vol. 2; Piscataway, NJ, USA.

Dehaspe, L. et al.; Discovery of Relational Association Rules; Relational Data Mining; 2001; pp. 189-212; Springer-Verlag.

Balter, J. et al.; A Knowledge-Driven Agent-Centred Framework for Data Mining in EMG; Comptes Rendus-Biologies; Apr. 1, 2002. pp. 375-389; vol. 325, No. 4; Elsevier, Paris, FR.

Lisi, F. et al.; Inducing Multi-Level Association Rules from Multiple Relations; Machine Learning; May 1, 2004; pp. 175-210; vol. 55, No. 2; Kluwer Academic Publishers-Plenum Publishers, NE.

Han, J. et al.; Constraint-Based, Multidimensional Data Mining; IEEE Service Center; Aug. 1, 1998; pp. 46-50; vol. 32, No. 8; Los Alamitos, CA, US.

Office Action for U.S. Appl. No. 11/835,225 dated Aug. 27, 2010; 22 pages.

Office Action for U.S. Appl. No. 11/835,225 dated Mar. 17, 2010; 18 pages.

Office Action for U.S. Appl. No. 11/835,225 dated Nov. 17, 2009; 20 pages.

Goethals, B. et al.; Relational Association Rules: Getting WARMeR; Pattern Detection and Discovery. :NAI 2447; pp. 125-139; 2002.

Kinga, R. et al; Warmr: A Data Mining Tool for Chemical Data; Journal of Computer-Aided Molecular Design; 15: 173-18; 2001.

Appice, A. et al; Mining and Filtering Multi-Level Spatial Association Rules with ARES; ISMIS 2005; LNAI 3488; pp. 342-353; 2005.

Liu, D., et al; Designing a Composite E-Service Platform with Recommendation Function; Computer Standards & Interfaces 25; pp. 103-117; 2003.

Wang, C. et al.; CMAP: A Flexible and Efficient Framework for Constraint-Based Mining of Activity Patterns; 12th International Conference on Information Fusion; 2009-07-06-09; pp. 1451-1458; Seattle, WA, US.

* cited by examiner

METHODS AND SYSTEMS FOR TEMPLATE DRIVEN DATA MINING TASK EDITING

BACKGROUND

The field of the invention relates generally to the aiding of domain experts to analyze data using data mining tasks, and more specifically, to methods and systems for template driven data mining task editing.

Domain experts often have in-depth knowledge about the data and the problem domain, but not about the data mining tools that they utilize. As such, it is a challenge for these domain experts to define exactly where data comes from, how the data can be extracted, what the best parameter settings are in order to use the data mining tool efficiently, how to specify a constraint in the tool's language, and how the discovered results should be processed.

Current data mining approaches require analysts to define data mining tasks from scratch. A simple copy-and-paste-and-modify approach may help reduce the task creation time, but the analysts are still required to understand the full specification of the task at hand. Often, the analysts have to repeatedly build the same, or a similar, specification for data sources and for result handling, as well as for some data/domain specific parameters.

As mentioned above, data mining tasks often require many different parameters to specify where data comes from, how data items are related, what constraints are used in the mining process, what types of domain knowledge are relevant, whether the user has special interest in some particular aspects, and how the discovered results are processed. Even though advanced data mining algorithms may be able to "self-tune" some controlling parameters, analyst entry of parameters (such as data source and result processing) is still necessary. In addition, controlling parameters might be tuned to different values for different application domains and a universal set of parameters that suit all purposes, all the time, does not exist.

For example, within a constraint-based mining of activity patterns (CMAP) system, tasks are created using, for example, an Eclipse based tool. This task creation process may involve an extensive knowledge about where data comes from, how each data item (table or predicate) is defined and interpreted, how data items can be used in the patterns, any domain knowledge, user interests or other constraints, and eventually, how discovered patterns are measured and processed. In this process, much of this information cannot be automatically deduced by the tool.

In summary, analysts may need to run data mining tasks on the same or similar data sets many times with slightly different parameter settings. Disadvantages and limitations of the existing solutions include that extensive and comprehensive knowledge of the data mining tool to accomplish the task is required and that users have to repeatedly specify parameters to run similar (or even the same) portion of mining tasks.

BRIEF DESCRIPTION

In one aspect, a computer-based method for creating data mining task templates for utilization in data mining activities is provided. The method includes defining, via a template editor and an associated user interface, a task template for discovery of common patterns occurring within data mining events, generating a task editor/wizard from the task template, creating example tasks from the task template via the task editor/wizard, running at least one of the example tasks, and refining the task template using results returned from execution of the at least one of the example tasks.

In another aspect, a computer programmed to create data mining task templates for utilization in data mining activities is provided. The computer includes a template editor, and a user interface associated with the template editor. The computer is programmed to define a task template for discovery of common patterns occurring within data mining events, using the template editor and the associated user interface, generate a task editor/wizard from the defined task template, utilize user input from the user interface to create example tasks using the task template and task editor/wizard, and refine the task template using results returned from execution of the example tasks.

In still another aspect, a system for data mining is provided that includes a network having a plurality of computers and a server communicatively coupled to the network and accessible by the plurality of computers. The server includes a memory having at least one data mining task template stored therein for discovery of common patterns occurring within input data and a task editor/wizard stored within the memory. The system is operable to utilize user input from one of the computers to create tasks using the task template and task editor/wizard, execute the created task, and store data mining results from execution of the task within the memory.

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein utilize a template based approach to reduce analysts' information load when creating complex data mining tasks. More specifically, the embodiments detail a template-based data mining task editing approach that includes architecture, template specification language and an interpretation algorithm, as well as design of related components.

Figure 1:
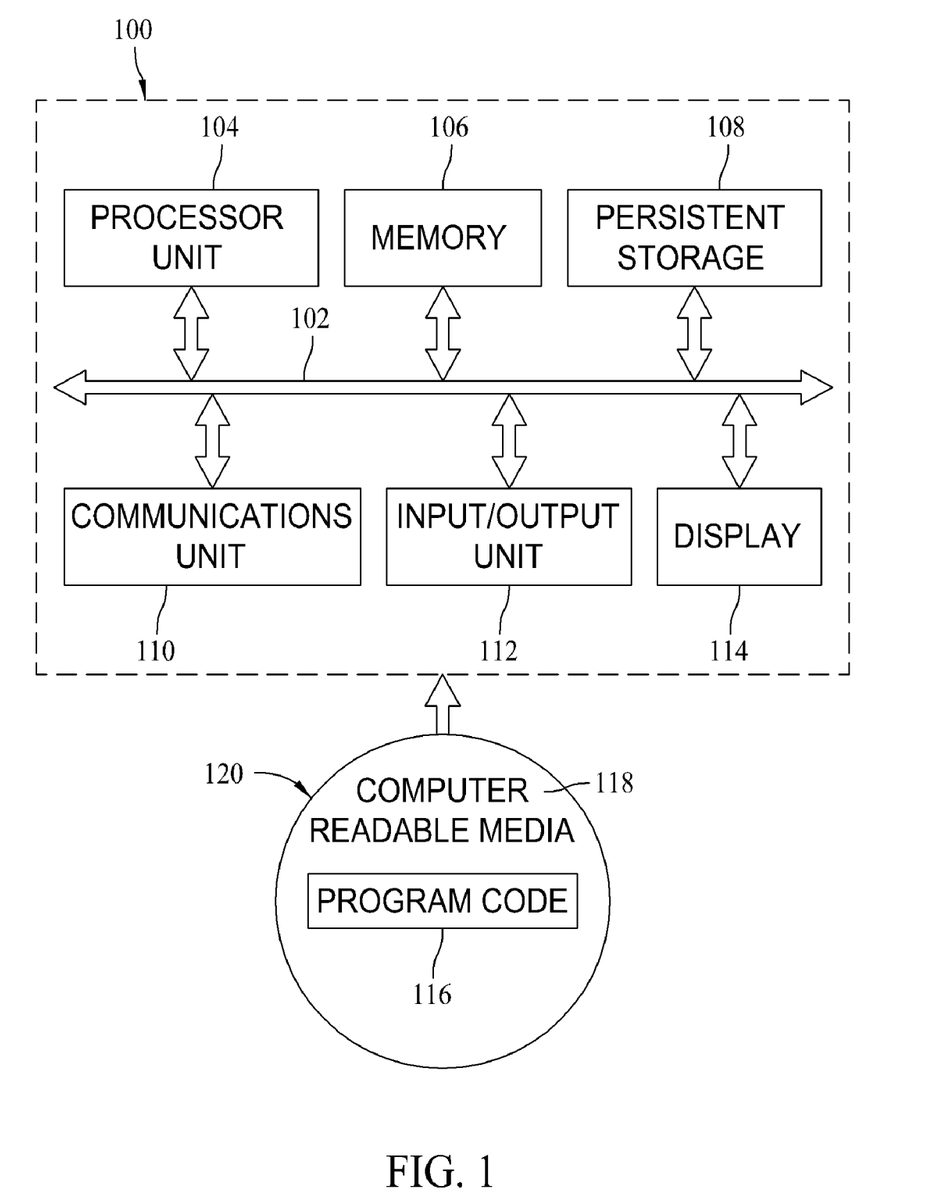
FIG. 1 is a diagram of a data processing system.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, without limitation, a random access memory or any other suitable volatile or non-volatile storage device. Persistent storage 108 may take various forms depending on the particular implementation. For example, without limitation, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, without limitation, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communication links.

Input/output unit 112 allows for input and output of data with other devices that may be connected to data processing system 100. For example, without limitation, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

As mentioned above, the above described system is operable to provide a template based approach that allows domain experts, or business analysts, to easily create and experiment with data mining tasks.

Figure 2:
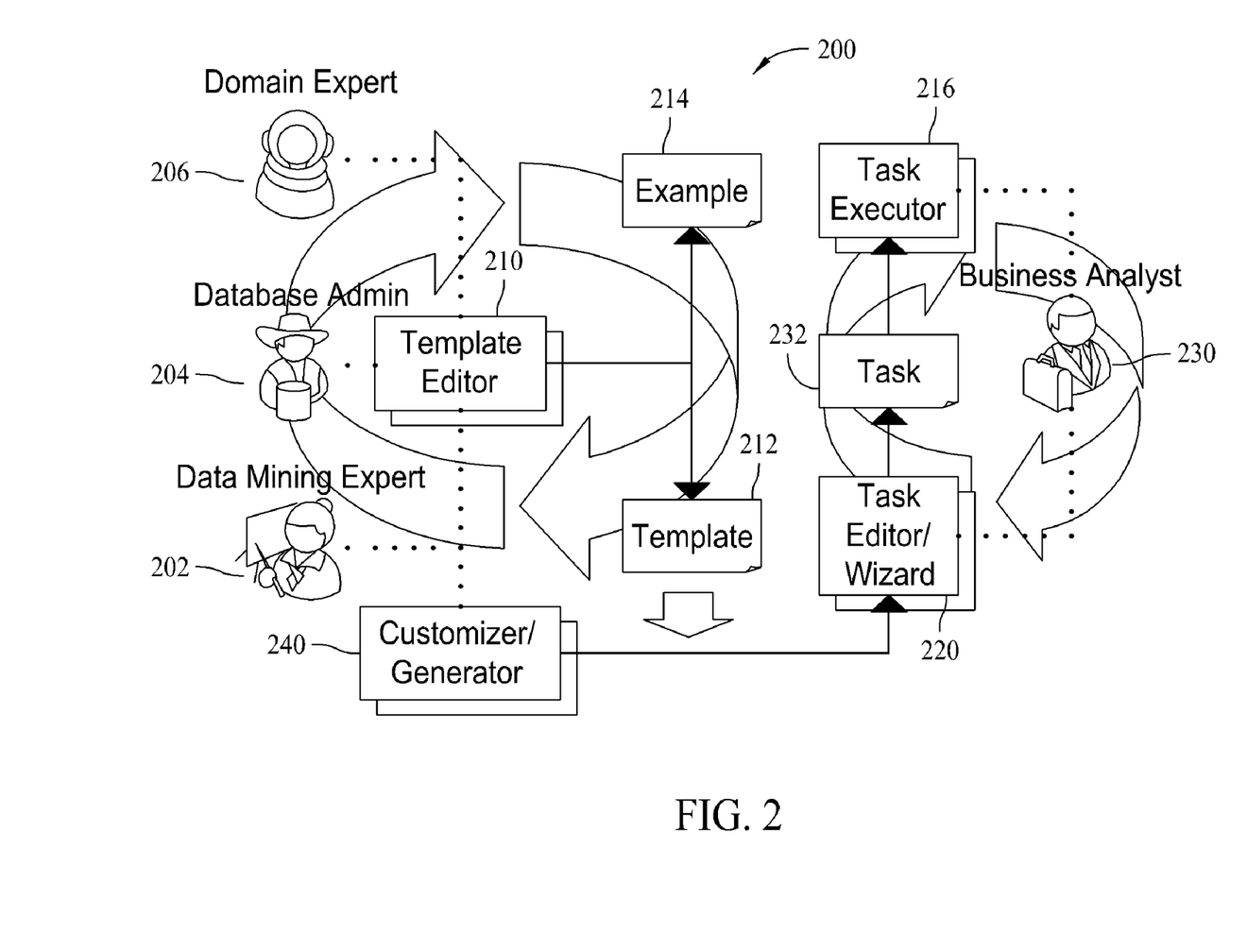
FIG. 2 is a diagram illustrating a template-based approach for the creation of data mining tasks.

Referring now to the figures, FIG. 2 is a diagram 200 illustrating a template-based approach for the creation of data mining tasks. A data mining expert 202, with the help of database administrators 204 and domain experts 206, utilizes a template editor 210 to create a task template 212 to discover common patterns, for example, from cyberspace surveillance events. In order to create a reasonable and reusable template, one or more of the data mining expert 202, the database administrator 204 and the domain expert 206, may need to refine the template definition by utilizing the template editor 210 to create example tasks 214, running the example tasks 214 using the task executor 216, investigating the mining results from the example tasks 214, and updating template 212 parameters to improve the results. In one embodiment, once a mature template 212 is created, it is sent to a task editor/wizard 220 for routine usage, for example, by business analysts.

Business analysts 230 need only to use the task editor/wizard 220 by populating a much smaller set of parameters in the template 212 to create a task 232. For example, business analysts 230 can simply specify a period of time of interest, some selected subset of event types, and the type of final report. Business analysts 230 then launch the created data mining task 232 and interpret the mining results. Under such a scenario, the business analysts 230 do not have to define data, define how to generate the report, select what domain knowledge is relevant, or determine how to tune controlling parameters.

Task editor/wizard 220 is operable, in one embodiment, to accept a task template 212 and provide a standard interface for business analysts 230. The data mining expert 202 is able to further customize the standard task editor/wizard 220 or even generate a separate task editor/wizard specifically for a template 212 by using a customizer/generator 240. For example, and in one embodiment, customizer/generator 240 generates a specialized web-based editor or wizard for different target browser support. Alternatively, customizer/generator 240 may be utilized to generate a stand-alone rich client application that also includes a task executor 216 as well as other visualization support capabilities as a one-stop analysis workbench.

In embodiments, the data mining tasks 232 are specified in XML and the template editor 210 and task editor/wizard 220 are built utilizing the Java programming language. In specific embodiments, constraint-based mining of activity patterns (CMAP) mining tasks are utilized as examples. In CMAP mining tasks, parameters are specified as XML elements or attributes. While the element names and attribute names are fixed for each data mining tool, the attribute values and element text content can be created using templates, for example, by replacing a place holder with a real starting time in a SQL query defining the data source. Depending on the specific data mining task, elements or attributes may, or may not, be selected in different tasks. In the following paragraphs, the detailed approach for the template specification and interpretation is described, including several with rather complicated template generation techniques.

At least one objective of a template specification language is to generate task specifications, for example in XML, based on some limited set of parameters. There are many different ways to generate XML documents. In one example, XSLT allows templates to be defined to match elements in input XML documents and therefore generate an output document based on the matched templates. While XSLT is powerful, it is also a complex language and it is often a challenging job for data mining analysts to create an XSLT script in order to generate a simple data mining task specification.

Figure 3:
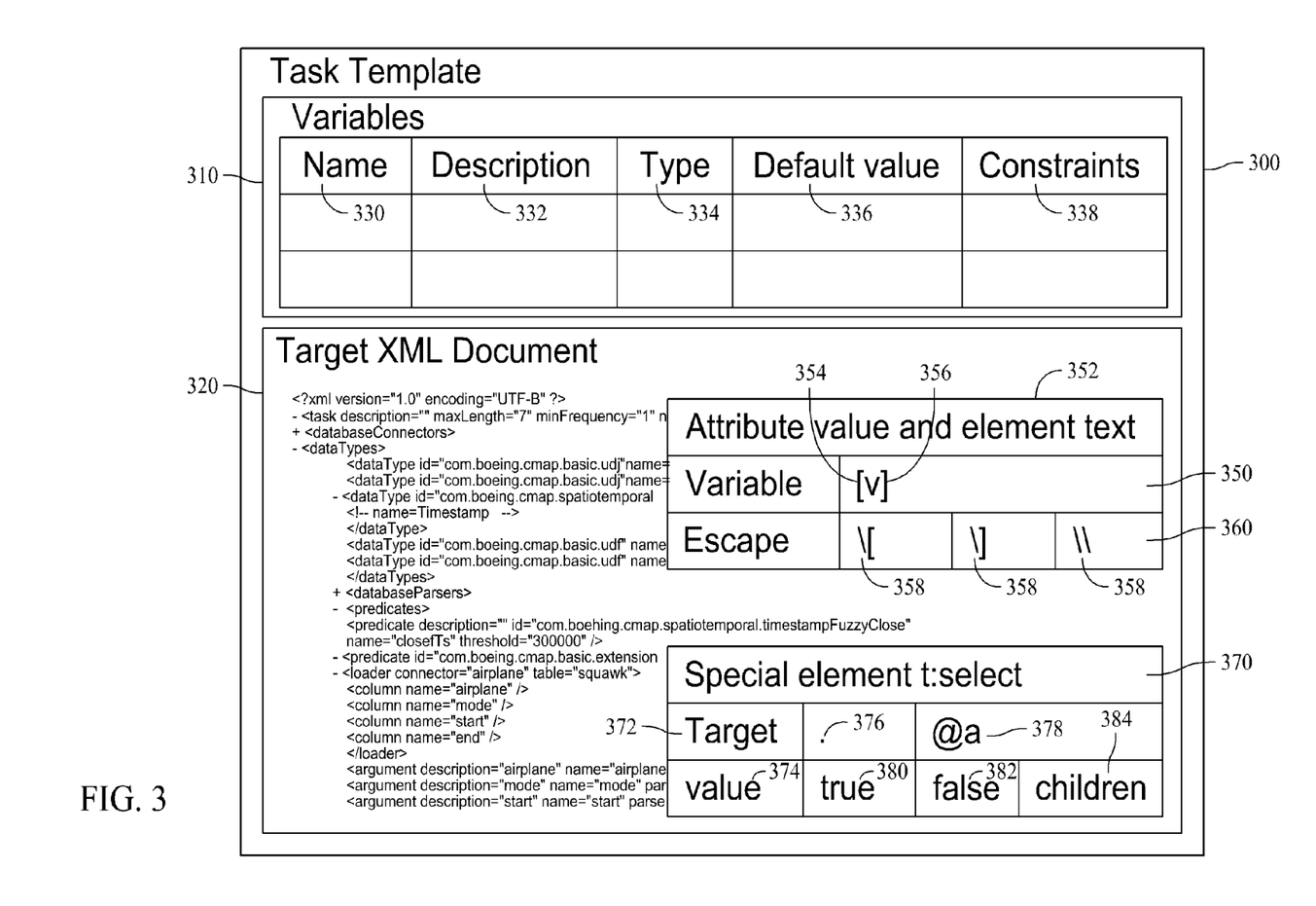
FIG. 3 is a diagram illustrating a template that includes a variable list and a target XML document.

As utilized herein, a template 300 includes a variable list 310 and a target XML document 320, as illustrated in FIG. 3. Each variable V within the list 310 includes a name 330, a description 332, a data type 334, a default value 136, and data integrity constraints 338. In embodiments, the name 330 is a string that must be unique for all variables within list 310. The description 332 is a free text field which describes the seman- tics of the variable. The default value 336 is a value provided by default if the user does not provide any value for the variable. In embodiments, the default value 336 has to be a valid value for the corresponding data type 334.

In embodiments, the data type 334 is either scalar or a collection. Scalar data types such as number, string, or Boolean are backed by Java classes that provide methods to determine whether an object is a valid value and convert between the value and its string representation. Such methods are enforceable by defining a Java interface, e.g., IDataType, with the required method declarations and requiring the Java class to implement this interface. Collection data types are defined by specifying their item data type, which must be a scalar data type. In addition, collection data types also specify whether the items are ordered and whether each item should be distinct from each other in the same collection. Note that a scalar data type can be an enumeration of values and the default value must be one of the enumerated values in this case.

In addition, a variable may include one or more data integrity constraints 338, each backed by a Java class that provides a method to check whether a user provided value satisfies the constraint. Similarly, satisfaction of the constraint 338 can be enforced by a Java interface, e.g., IConstraint. A non-exhaustive list of example constraints includes: the minimum value inclusively (for ordinal data types), the minimum value exclusively (for ordinal data types), the maximum value inclusively (for ordinal data types), the maximum value exclusively (for ordinal data types), the minimum size (for textual data types and collection data types), the maximum size (for textual data types and collection data types), the matching regular expression pattern (for textual data types), and other arbitrary constraints backed up by a Java class, which can be constructed without parameters while providing a method to determine whether a value is valid.

The target XML document 320 utilizes the variables 310 in attribute values and element text contents 352 by quoting each variable 350 in a pair of special symbols 354 and 356. For example, using the left and the right bracket as the special symbols, a variable v is quoted as [v] in FIG. 3. The target XML document contains elements, and each element contains attributes and/or text contents. The variables are quoted in the target XML document to indicate that the value of variables (e.g., Jan. 1, 2009 as the value of a variable v) should be used instead of the string consisting of the special symbols and the variable names (e.g., [v]) in the interpreted template. Hence, the target XML document is not showing how variables are quoted, but rather quotes them directly.

The special symbols 354 and 356 are escaped by another special symbol 358 (the backslash symbol is used in FIG. 3 as an example) in order to be included literally in attribute values or element text contents 352. As shown at 360, the special symbol 358 is escaped by itself in order to be included literally.

For example, the following XML segment uses two variables v1 and v4\: <e a='value [v1] and \[v2\]'>content v3 and \\[v4\\]</e>. The square brackets around v2 are escaped and hence will be included (without backslashes) as normal text instead of a variable. The double backslash symbols before variable v4\ will be considered a single backslash. If the value of v1 is 's1', and 's2' for v4\, the template will create an element as follows: <e a='value s1 and [v2]'>content v3 and \s2</e>.

In addition, the target XML document 320 can include special attributes defined with a special namespace, for example http://www.tasktemplate.info/ with "t" as the prefix for this special namespace. Each element can have zero or more special child elements 370 named t:select. These special child elements 370, in one embodiment, have two attributes: target 372 and value 374. The attribute value for target 372 can be either a period '.' 376 to refer to the containing element, or a string started with the symbol @ 378 followed by the name of one of the attributes of the containing element. The attribute value for value 374 can be 'true' 380, 'false' 382, or 'children' 384 (without quotes). The choice of 'children' 384 can only be specified when the target 372 attribute has the value period '.' (without quotes) 376. In most embodiments, the attribute value for value 374 is determined by a template variable. The following is an example template snippet:

```
<e xlmns:t='http://www.tasktemplate.info/'a='v'>
   <t: select target='@a' value='[v1]'/>
   <e1 a1='v11'>
      <t: select target='.'value='[v2]'/>
      ...
   </e1>
   ...
</e>
```

The special symbols (square brackets 354, 356, backslash 358, period 376 and @ 378), exact name for the special elements 370 and attributes 372 374, namespace URL or even the attribute values can be different, as long as they are consistent and known to the template editor 210 and task editor 220.

Once a template 300 is created and fed into a Task Editor/Wizard 220, the business analyst 230 can specify values for the variables 310 included in the template. The Task Editor/Wizard 220 then creates a task 232 by interpreting the template 300 with variable values specified by the business analyst 230. When the variables 310 in the template 300 are all scalar variables, the interpretation is straightforward: first replace the variables with their values (string representations) in attribute values and element text contents, then remove attributes and elements if the corresponding special select 370 element has a 'false' value, and finally replace elements with their children when the corresponding special select 370 element has a 'children' value.

Figure 4:
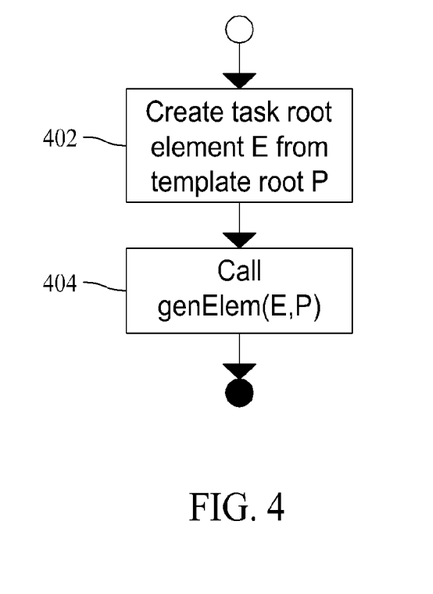
FIG. 4 is a flowchart that illustrates a template interpretation algorithm.

The interpretation gets complicated when collection variables are used in the general case. FIG. 4 is a flowchart 400 that illustrates an algorithm to interpret templates 300 in the general case where the values of variables 310 can be of a collection data type. This algorithm includes first creating 402 a root element of a task from a template root element, and then generating its attributes and child nodes by calling 404 the genElem subroutine with the task root and the template root.

Figure 5:
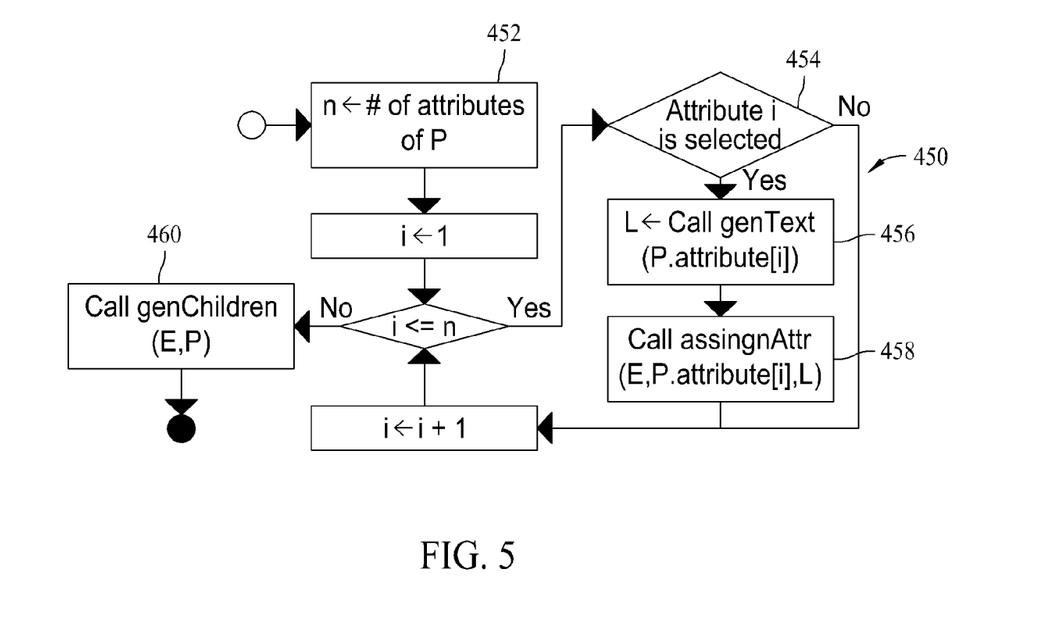
FIG. 5 is a flowchart illustrating one embodiment of a genElem subroutine, which accepts a task XML element E and a template XML element P.

FIG. 5 is a flowchart 450 illustrating one embodiment of a genElem subroutine. The subroutine first loops 452 through all the attributes of the template element, P. For each attribute that is selected 454 (according to the value of the special t:select attribute), the subroutine will create the attribute in the task element with the text in the template. Since the template may use one or more collection variables in the attribute text, this subroutine calls 456 genText to obtain a list of text strings (including all combinations of the values in all the collection variables), and then calls 458 assignAttr to create attributes for each of the text strings. Once the attributes are created, the genElem subroutine calls 460 genChildren to create child elements and text nodes.

Figure 6:
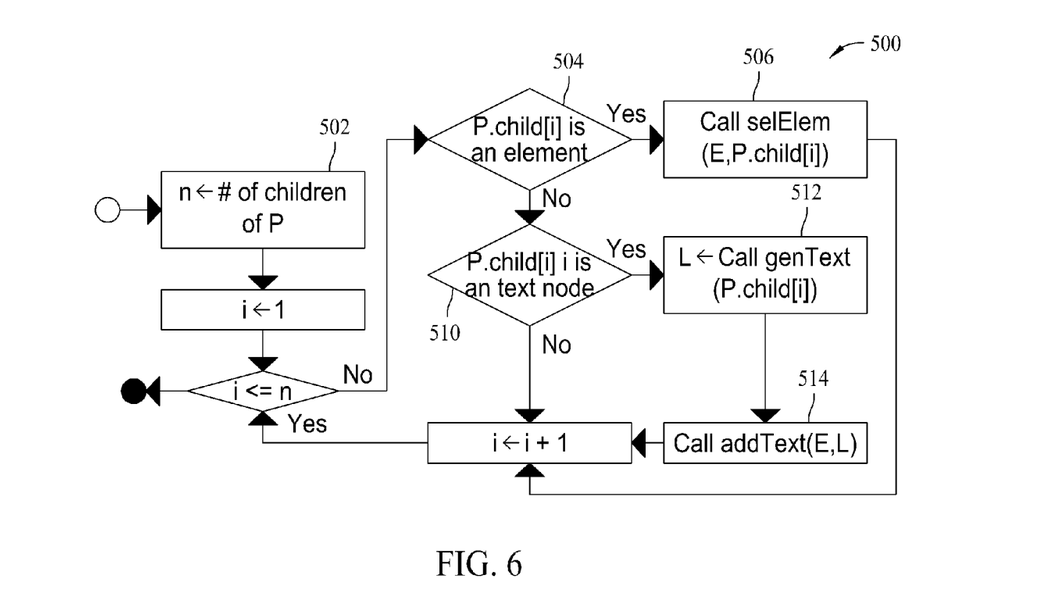
FIG. 6 is a flowchart illustrating one embodiment of a genChildren subroutine, which accepts a task XML element E and a template XML element P.

FIG. 6 is a flowchart 500 illustrating one embodiment of a genChildren subroutine. The genChildren subroutine loops 502 through all the children of the template element. For each child node, if 504 the child node is an element node, genChildren calls 506 selElem to handle the child element; if 510 the child node is a text node, genChildren first calls 512 getText to get a list of text strings (including all combinations of the values in all the collection variables in the template text node), and then calls 514 addText subroutine to add a text child node to the task element.

Figure 7:
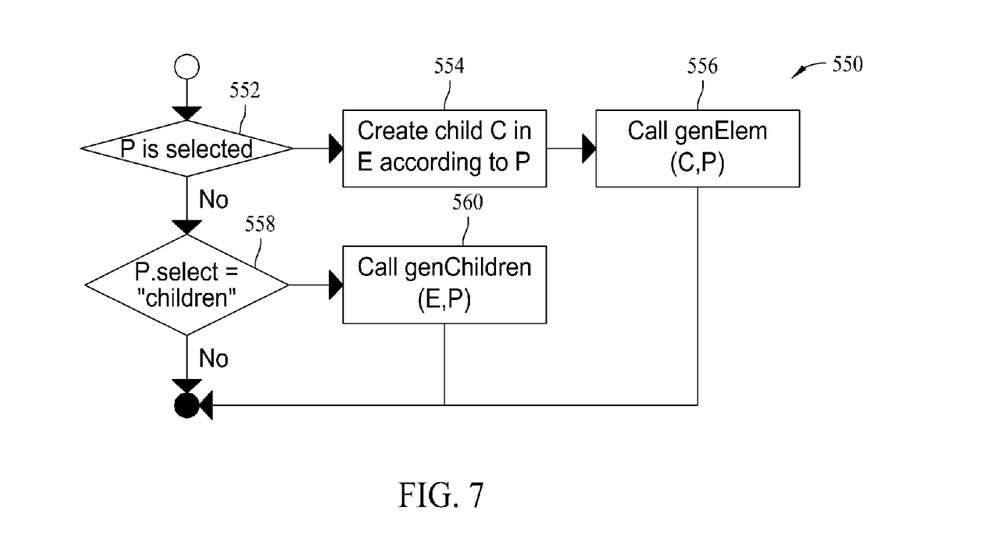
FIG. 7 is a flowchart illustrating one embodiment of a selElem subroutine which accepts a task XML element E and a template XML element P.

FIG. 7 is a flowchart 550 illustrating one embodiment of a selElem subroutine. If the template element is selected 552 (according to the value of the t:select attribute), the selElem subroutine creates 554 a child element into the task element according to the template element, and then calls 556 genElem to recursively handle the child element according to the template. However, if the template element selection 558 is "children", the genElen subroutine calls 560 the subroutine genChildren to generate children into the task element according to the children of the template element.

Figure 8:
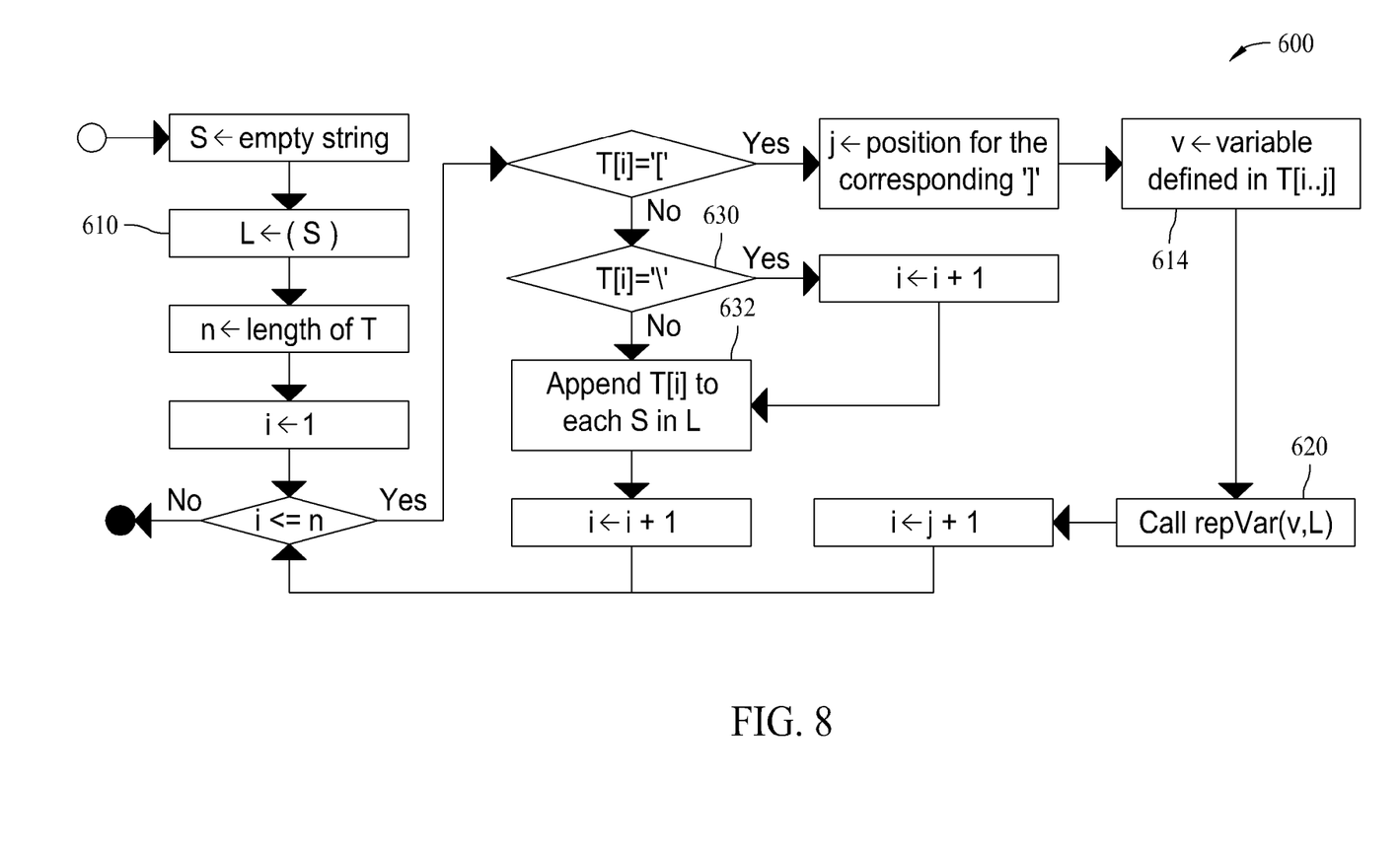
FIG. 8 is a flowchart that illustrates one embodiment of a genText subroutine, which accepts a template string T and generates a list of result string in L.

FIG. 8 is a flowchart 600 that illustrates one embodiment of a genText subroutine, which accepts a template string T and generates a list of result string in L. This embodiment of genText subroutine first initializes 610 L as a list containing an empty string, and then walks through the template string. If the genText subroutine finds 614 a template variable, it calls 620 the repVar subroutine to update the list L. The genText subroutine also handles 630 the special escape character. For normal characters or special yet escaped characters, the genText subroutine appends 632 those characters to each string in the list.

Figure 9:
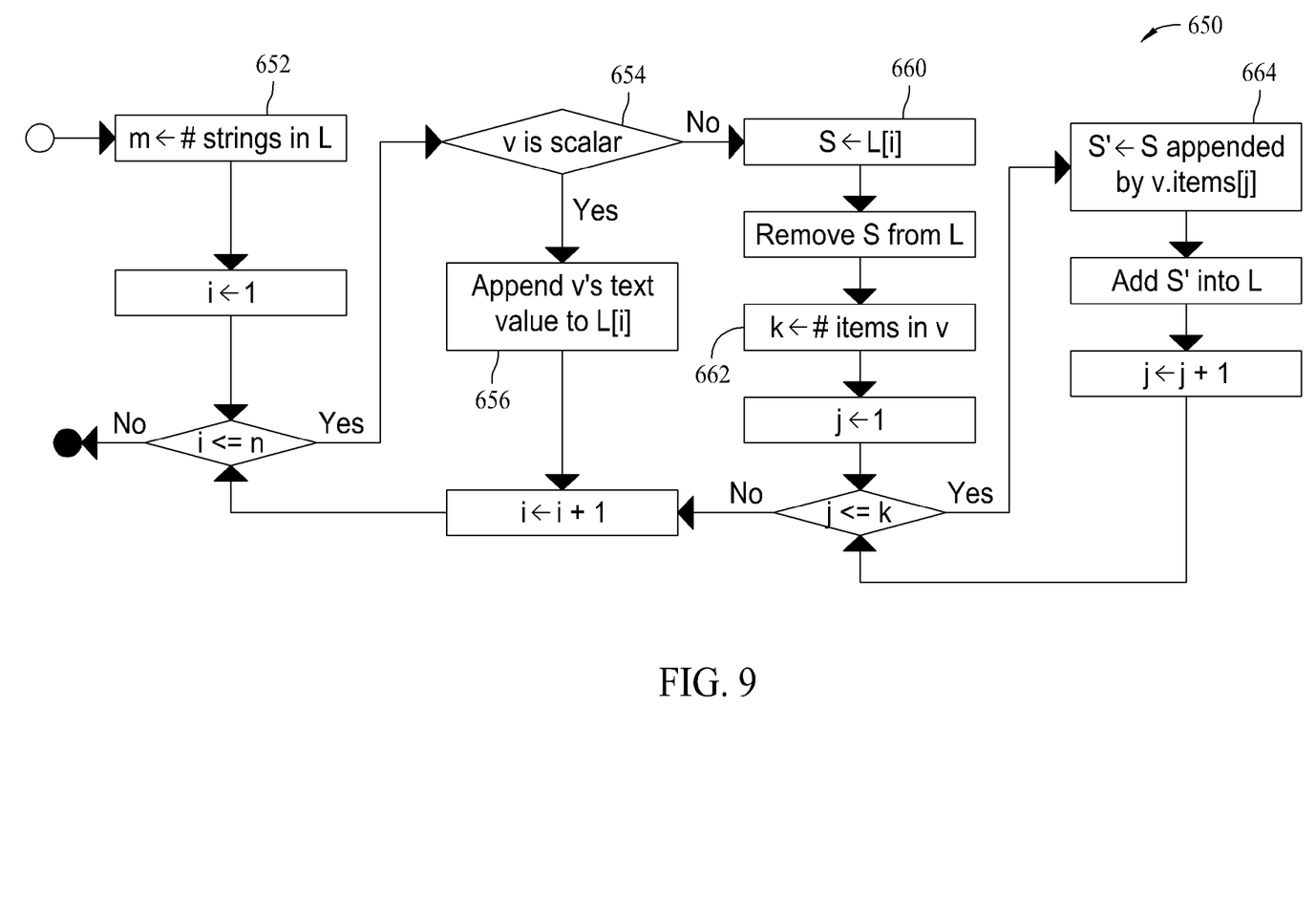
FIG. 9 is a flowchart that illustrates one embodiment of a repVar subroutine, which accepts a variable v and a list of working strings L to be expanded using the value of the variable.

FIG. 9 is a flowchart 650 that illustrates one embodiment of a repVar subroutine. The repVar subroutine loops 652 through all strings in the list. If the variable is a scalar variable 654, repVar simply appends 656 the value of v to each string in the list. Otherwise, v is a collection variable, and it is assumed that the collection variable has k item values. For each string S in the list 660, the repVar subroutine replaces 662 the string S with k copies, each copy being S appended 664 by one of the k item values.

Figure 10:
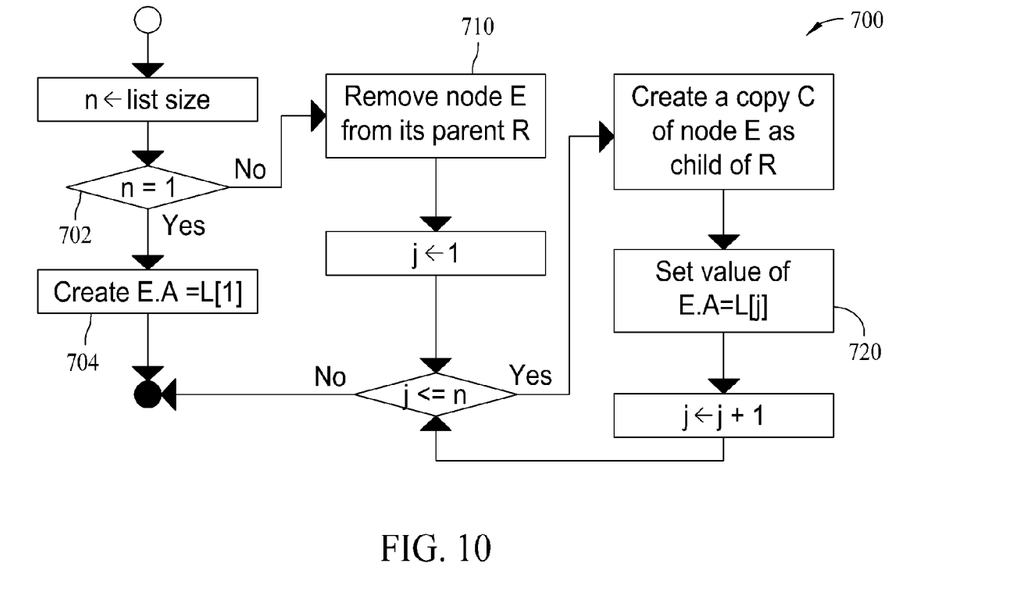
FIG. 10 is a flowchart that illustrates one embodiment of an assignAttr subroutine, which accepts a task XML element E, an attribute A to be added to E and a list of strings L to be assigned as values for the attribute A.

FIG. 10 is a flowchart 700 that illustrates one embodiment of an assignAttr subroutine. If the list contains 702 only a single string, the assignAttr subroutine creates 704 a single attribute for the task element with the single string as the attribute value. Otherwise, assignAttr subroutine replaces 710 the current element node with n copies, where n is the number of strings in the list. Each copy is the same as the current element with a new attribute whose value 720 is one of the strings in the list.

Figure 11:
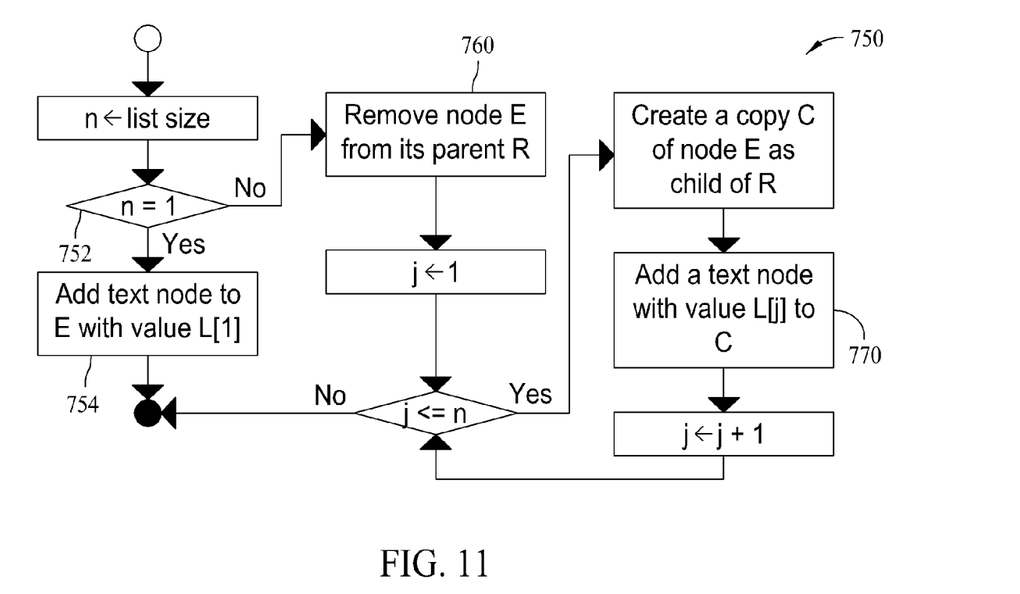
FIG. 11 is a flowchart that illustrates one embodiment of an addText subroutine, which accepts a task XML element E and a list strings L to be assigned as the content of the element E.

FIG. 11 is a flowchart 750 that illustrates one embodiment of an addText subroutine. The addText subroutine is similar to assignAttr subroutine. If the list contains 752 only a single string, the addText subroutine creates 754 a single text node for the task element with the single string as the content value. Otherwise, the addText subroutine replaces 760 the current element node with n copies, where n is the number of strings in the list. Each copy is the same as the current element with a new text node whose value 770 is one of the strings in the list.

The template editor 210 includes several functions that provide an ability to support the template-specific editing. Specifically, the template editor 210 includes an interface to display a list of currently defined variables and allow the user to add a new variable, delete an existing variable, or clear all variable definitions. In addition, the template editor is configured to check whether each variable has a unique name. The template editor 210 further provides an interface to edit a template variable by accepting its name, description, data type, default value, and optionally constraints. The data type field accepts any Java class implementing the given interface (e.g., IDataType). The default value is validated upon input.

Each variable may have multiple constraints. An interface is necessary for the user to add a new constraint, delete an existing constraint, or clear all constraints. The editor also detects conflicts between constraints. Each constraint may have an optional description to explain the reason to include the constraint with the specific parameters (such as length and boundary). A core part of the constraint specification is a Java class implementing the given interface (e.g., IConstraint in previous discussion). As such, the template editor 210 provides a constraint specific interface to edit the constraint parameters. For optional task configuration elements, an interface is provided that allows the user to optionally specify that the element is selected or passed-through (i.e., their child elements and text contents are copied to the parent) according to the value of a template variable.

For optional task configuration attributes, an interface is provided that allows the user to optionally specify that the attribute is selected according to the value of a template variable, or an expression created using some template variables. For configuration attribute values and element text contents, the interface is modified to allow the user to use template variables. For example, for a text field interface, the user is allowed to insert template variables into the text at any position. The modified interface provides a list of variable names whenever triggered, e.g., when the user typing the left square bracket '[', which is not preceded by a backslash '\'. For a combo box or push-down list or multi-selection list interface, all the variable names are added to the selection by enclosing each variable name with square brackets. For other interfaces (e.g., checkbox, toggle button, spinner, slider, etc.), a checkbox is added (to switch between using the variable and using the original interface) with a combination box of variable names.

In addition, the template editor 210 allows the user to generate example tasks, validate the generated tasks, and submit them to the task executor 36, thereby helping the user to develop a reusable template and tune certain parameters, for example, through trial and error.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for creating data mining task templates for utilization in data mining activities, said method comprising:

receiving a task template for discovery of common patterns occurring within data mining events;

creating example tasks from the task template by interpreting the task template with specific values of variables, wherein interpreting the task template comprises:

creating a root element of a task from a root element associated with the task template when the variables are a collection data type; and generating attributes and child nodes of the task using the task root element and the task template root element, wherein generating attributes and child nodes of the task using the task root element and the task root template element comprises:

looping through all the attributes of the task template root element;

obtaining a list of text strings from a template string specified as a value of an attribute for each selected attribute in the task template root element;

creating attributes using the task root element, an attribute name specified by an attribute in the task template root element, and the obtained list of text strings from the same attribute in the task template root element for each selected attribute in the task template root element; and creating child elements and text nodes using the task root element and the task template root element;

running at least one of the example tasks; and refining the task template using results returned from execution of the at least one of the example tasks.

2. The method according to claim 1 wherein interpreting the task template with variable values comprises:

replacing the variables with string representations with attribute values and element text contents;

removing attributes and elements if a corresponding select element has a value of 'false'; and replacing each element with a corresponding child when the corresponding select element has a value of 'children'.

3. The method according to claim 1 wherein creating child elements and text nodes using the task root element and the task template root element comprises:

looping through all the child nodes of the task template root element;

creating a child element into the task root element using the task root element and a task template child element for each child element of the task template root element;

obtaining a list of text strings from the template string specified as a value of a text child node for each text child node in the task template root element; and creating text child nodes using the task root element and the obtained list of text strings for each text child node in the task template root element.

4. The method according to claim 3 wherein creating a child element into the task root element using a task template root element comprises:

if the task template root element selection is 'true', creating a child element into the task root element with a name specified in the task template root element; and generating attributes and child nodes of the task using the task child element and the task template root element; and if the task template root element selection is 'children', creating child elements and text nodes using the task root element and the task template root element.

5. The method according to claim 1 wherein obtaining a list of text strings from a template string comprises:

initializing a list containing an empty string;
looping through all characters of the template string;
identifying all variables specified in the template string;
updating the list using a variable for each identified variable; and
appending each normal or escaped character in the template string to each string in the list.

6. The method according to claim 5 wherein updating the list using a variable comprises:
looping through all strings in the list;
if the template variable is a scalar variable,
appending the value of the scalar variable to each string in the list; and
if the template variable is a collection variable,
removing a string from the list for each string in the list; and
adding a new string into the list where the new string is obtained by appending an item from the collection value of the variable for each item from the variable value.

7. The method according to claim 1 wherein creating attributes using the task root element, an attribute name and a list of text strings comprises:
if the list contains only a single string,
creating an attribute for the task root element with a given name and the single string as the value; and
if the list contains multiple strings, said method includes:
removing the task root element from its parent element;
looping through all strings in the list; and
creating a new child into the parent task element where the new child is the same as the removed task root element plus a new attribute with a given name and a string as its value for each string in the list.

8. The method according to claim 3 wherein creating text child nodes using the task root element and a list of text strings comprises:
if the list contains only a single string,
creating a text child node into the task root element with the single string as the value; and
if the list contains multiple strings, said method includes:
removing the task root element from its parent element;
looping through all strings in the list; and
creating a new child into the parent task element where the new child is the same as the removed task root element plus a new child text node with a string as its value for each string in the list.

9. The method according to claim 1 wherein creating example tasks comprises providing a standard user interface, the standard user interface providing a capability for a user to specify a period of time of interest, select a subset of event types, and select a type of report to be generated.

10. The method according to claim 1 wherein said received task template comprises list of variables where each variable includes:
a name comprising a string that is unique for all variables within the list;
a description comprising a free text field that describes semantics associated with the variable;
a data type for the variable;
a default value utilized if a user does not provide any value for the variable; and
at least one data integrity constraint.

11. The method according to claim 10 wherein said received task template comprises a target XML document that utilizes the variable from the list of variables in the template.

12. The method according to claim 10 wherein the at least one data integrity constraint includes one or more of:
a minimum value inclusively for ordinal data types;
a minimum value exclusively for ordinal data types;
a maximum value inclusively for ordinal data types;
a maximum value exclusively for ordinal data types;
a minimum size for textual data types and collection data types;
a maximum size for textual data types and collection data types;
a matching regular expression pattern for textual data types; and
arbitrary constraints backed up by a Java class.

13. A computer programmed to create data mining task templates for utilization in data mining activities, said computer programmed to:
receive a task template for discovery of common patterns occurring within data mining events;
create example tasks using the task template by interpreting the task template with specific values of variables, wherein interpreting the task template comprises:
creating a root element of a task from a root element associated with the task template when the variables are a collection data type; and
generating attributes and child nodes of the task using the task root element and the task template root element, wherein to generate attributes and child nodes of the task, said computer is further programmed to:
loop through all the attributes of the task template root element;
obtain a list of text strings from a template string specified as a value of an attribute for each selected attribute in the task template root element;
create attributes using the task root element, an attribute name specified by an attribute in the task template root element, and the obtained list of text strings from a same attribute in the task template root element for each selected attribute in the task template root element; and
create child elements and text nodes using the task root element and the task template root element; and
refine the task template using results returned from execution of the example tasks.

14. The computer programmed according to claim 13 wherein to interpret the task template with variable values, said computer further programmed to:
replace the variables with string representations in attribute values and element text contents;
remove attributes and elements if a corresponding select element has a value of 'false'; and
replace elements with their children when the corresponding select element has a value of 'children'.

15. The computer programmed according to claim 13 wherein to create child elements and text nodes, said computer is further programmed to:
loop through all the child nodes of the task template root element;
create a child element into the task root element using the task root element and a task template child element for each child element of the task template root element;
obtain a list of text strings from a template string specified as a value of a text child node for each text child node in the task template root element; and create text child nodes using the task root element and the obtained list of text strings for each text child node in the task template root element.

16. The computer programmed according to claim 15 wherein to create a child element into the task root element, said computer is programmed to:
   create a child element into the task root element with a name specified in the task template root element and generate attributes and child nodes of the task using the task child element and the task template root element, if the task template root element selection is 'true'; and
   create child elements and text nodes using the task root element and the task template root element if the task template root element selection is 'children'.

17. The computer programmed according to claim 13 wherein to obtain a list of text strings from a template string, said computer is programmed to:
   initialize a list containing an empty string;
   loop through all characters of the template string;
   identify all variables specified in the template string;
   update the list using a variable for each identified variable; and
   append each normal or escaped character in the template string to each string in the list.

18. The computer programmed according to claim 15 wherein to obtain a list of text strings from a template string, said computer is programmed to:
   initialize a list containing an empty string;
   loop through all characters of the template string;
   identify all variables specified in the template string;
   update the list using a variable for each identified variable; and
   append each normal or escaped character in the template string to each string in the list.

19. The computer programmed according to claim 17 wherein to update the list using a variable, said computer is programmed to:
   loop through all strings in the list;
   if a template variable is a scalar variable,
      append the value of the scalar variable to each string in the list; and
   if a template variable is a collection variable,
      remove a string from the list for each string in the list; and
      add a new string into the list where the new string is obtained by appending an item from the collection value of the variable for each item from the variable value.

20. The computer programmed according to claim 13 wherein to create attributes using the task root element, an attribute name and a list of text strings, said computer is programmed to:
   create an attribute for the task root element with a given name and the string as the value if the list contains only a single string; and
   if the list contains multiple strings, remove the task root element from its parent element, loop through all strings in the list, and create a new child into the parent task element where the new child is the same as the removed task root element plus a new attribute with the given name and a string as its value for each string in the list.

21. The computer programmed according to claim 15 wherein to create text child nodes using the task root element and a list of text strings, said computer is programmed to:
   create a text child node into the task root element with the string as the value if the list contains only a single string; and
   if the list contains multiple strings, remove the task root element from its parent element, loop through all strings in the list, and create a new child into the parent task element where the new child is the same as the removed task root element plus a new child text node with a string as its value for each string in the list.

22. The computer programmed according to claim 13 wherein to create example tasks, said computer is programmed to provide a standard user interface, the standard user interface providing a capability for a user to specify a period of time of interest, select a subset of event types, and select a type of report to be generated.

23. The computer programmed according to claim 13 wherein to receive a task template, said computer is programmed to receive a list of variables where each variable includes:
   a name comprising a string that is unique for all variables within the list;
   a description comprising a free text field that describes semantics associated with the variable;
   a data type for the variable;
   a default value utilized if a user does not provide any value for the variable; and
   at least one data integrity constraint.

24. A system for data mining comprising:
   a network comprising a plurality of communicatively coupled computers; and
   a server communicatively coupled to said network and accessible by said plurality of computers, said server comprising a memory, said memory comprising at least one data mining task template stored therein for discovery of common patterns occurring within input data, said system operable to:
   create tasks using the task template by interpreting the task template with specific variable values, wherein interpreting the task template comprises:
      creating a root element of a task from a root element associated with the task template when the variables are a collection data type; and
      generating attributes and child nodes of the task using the task root element and the task template root element, wherein generating attributes and child nodes of the task using the task root element and the task template root element comprises:
         looping through all the attributes of the task template root element;
         obtaining a list of text strings from a template string specified as a value of an attribute for each selected attribute in the task template root element;
         creating attributes using the task root element, an attribute name specified by an attribute in the task template root element, and the obtained list of text strings from the same attribute in the task template root element for each selected attribute in the task template root element; and
         creating child elements and text nodes using the task root element and the task template root element;
   execute the created tasks; and
   store data mining results from execution of the tasks within said memory.

* * * * *